United States Patent Office 3,692,570
Patented Sept. 19, 1972

3,692,570
MICROPOROUS SHEET STRUCTURES AND A
PROCESS FOR THE PREPARATION THEREOF
Harro Träubel, Leverkusen-Kueppersteg, and Klaus König, Leverkusen, Germany, assignors to Farbenfabriken Bayer Aktiengesellschaft, Leverkusen, Germany
No Drawing. Filed Nov. 29, 1968, Ser. No. 780,263
Claims priority, application Germany, Dec. 7, 1967, F 54,240
Int. Cl. B29d 27/00; C09d 3/48; D06n 3/04
U.S. Cl. 117—161
7 Claims

ABSTRACT OF THE DISCLOSURE

Microporous sheet structures are prepared by reacting a compound having at least two terminal NCO groups and a molecular weight of between 100 and 10,000, a compound having at least two OH or NH groups and a molecular weight of 500 to 10,000 and/or a compound having a molecular weight of 18 to 500 which contains at least two OH, two NH or at least one OH and one NH group in an inert medium that dissolves the reactants but not the product, the reaction being conducted stepwise by adding one of the reactants to the others in at least two increments such that the reaction is substantially complete after each addition, applying the reaction mixture to a substrate and removing the inert medium.

This invention relates to microporous sheetings and a process for the production thereof. More particularly it relates to sheetings prepared from high molecular weight and/or low molecular weight compounds which contain at least two NCO groups and compounds which contain at least two OH or NH groups in a solvent or mixture of solvents.

It is already known that one can treat solutions of polyurethanes in volatile organic, highly polar solvents with a non-solvent (for the polyurethane) which has a higher evaporation number than the solvent, and that a substantial proportion of the solvent can be evaporated off before the nonsolvent after the shaping process. Sheet structures which have good microporosity and good physical properties are thereby obtained. It has, however, been found that in many cases only toxic and expensive solvents can be used for this process. Another disadvantage was that in many cases only very dilute polyurethane solutions could be used.

It is therefore an object of this invention to provide improved microporous sheet structures. It is another object to provide an improved method of making microporous sheet structures. It is another object to provide microporous sheets having very good flexibility and excellent solvent resistance.

The foregoing objects and others which will become apparent from the following description are accomplished in accordance with the invention, generally speaking, by providing microporous sheet structures by polyaddition in solution, with shaping, of (1) an organic compound containing at least two terminal NCO groups and having a molecular weight of from about 100 to about 10,000,
(2) an organic compound containing at least two OH or NH groups and having a molecular weight of from about 500 to about 10,000 and/or
(3) a compound having a molecular weight of from about 18 to about 500 containing at least two OH or NH groups or at least one OH and one NH group, including water, to form a polylurethane in the homogeneous state having a Shore A hardness of at least 40, a tensile strength of at least 50 kg. wt./cm.$^2$ and a softening range above about 80° C., by dissolving the components (1) to (3) in a non-solvent for the polyaddition product to be formed, or in a solvent mixture which contains at least one non-solvent for the polyaddition product to be formed, the non-solvent having an evaporation number at least 1.5 times greater than that of the other solvent components, or by dispersing the solvents in the mixture of compounds (1) to (3), applying the reaction mixture to a substrate, while still pourable thereby shaping them, leaving them on the substrate to react and at the same time and/or thereafter removing the solvent or solvents, the reaction of the compounds (1) to (3) being conducted stepwise in at least two increments, one component being added gradually to a mixture of the two other components, i.e. generally to the compounds 1 and 3 or 1 and 2, the polyaddition reaction is allowed to proceed to completion each time a portion of the third component is added to the mixture of the other two components.

Any suitable high molecular weight compounds containing OH groups may be used, such as, polyesters, polyethers, polyesteramides, polythioethers and polyacetals. High molecular weight compounds having terminal carboxyl, amino and mercapto groups may also be used. Polysiloxanes which contain groups that are reactive with isocyanates may even be used. Suitable compounds are described, for example, in J. H. Saunders, K. C. Frisch "Polyurethanes," Part I, New York 1962, pages 33 to 61 and in the literature cited therein.

Any suitable polyisocyanates may be used (see Siefken, Ann. 562, 75–136 (1949)), and also, such as, for example tetramethylene and hexamethylene diisocyanate, 1,4-cyclohexanediisocyanate, m- and p-phenylene diisocyanate, 2,4- and 2,6-toluylenediisocyanate (and isomeric mixtures thereof), 4,4'-diphenylmethanediisocyanate, 1,5-naphthylene diisocyanate, p-xylylene diisocyanate, 4,4'-diisocyanato - diphenylether, diphenyl-2,4,4'-triisocyanate and low molecular weight products of addition of excess polyisocyanates to di- and polyols or to ureas or polyisocyanates which contain carbodiimide and isocyanurate groups.

The third component may be a glycol, such as butanediol, hexanediol, bis-ethoxylated hydroquinone or dihydroxy-naphthalene or xylylene glycol, a diamine such as hydrazine, carbodihydrazide, terephthalic acid dihydrazide, ethylenediamine or p-phenylenediamine or an aminoakanol such as ethanolamine, diethanolamine and hydrazinoethanol and the like. A detailed description of these compounds may be found in Houben-Weyl "Makromolekulare Stoffe II," Stuttgart 1962, pages 71 to 75, 79 to 84 and 87 and in E. Müller et al. "Angewandte Chemie" 64, pages 523 to 531 (1952) and in the literature cited therein.

The starting components to be used according to the invention in the production of microporous sheet structures are so chosen that on polyaddition they yield an elastomeric polyaddition product which has a tensile strength (DIN 53 328; developed April 1967) greater than 50 kg. wt./cm.², preferably greater than 150 kg. wt./cm.², Shore hardness A (DIN 53 505) greater than 40, preferably greater than 60, and a softening range (e.g. determined on a Kofler bench as described in Houben-Weyl (1953), Analytische Methoden, pages 789 and 792) above 80° C., preferably above 130° C. Combinations of starting materials which yield such polyaddition products are described e.g. in Angewandte Chemie 64 (1962), 523 to 531. Other suitable combinations can be found by producing a polyaddition product from the starting components in known manner in a highly polar solvent such as dimethylformamide or by the melt casting process. The resulting shaped articles can be tested for the above mentioned physical properties. In addition, the solubility of the polymers in different solvents can be determined using films.

The proportions of the components (1) to (3) may vary within wide limits. It is usual that the molar quantity of component (3) (chain lengthening agent) should be greater the higher the molecular weight of compound (2). The molar quantity of the isocyanates used depends on the total quantity of OH and NH groups present. If, for example component (2) has a molecular weight of about 1500 to 3000, component (3) may be employed in one to five times molar excess, preferably 1.5 to 4 times molar excess, provided that the isocyanate (1) is of low molecular weight. If isocyanate prepolymers, i.e. reaction products of component (2) with low molecular weight isocyanates, are used as starting material, compound (2) may be omitted.

The reaction may be carried out at temperatures between −40 and +200° C., preferably 10 to 150° C. The solubility of the polyadducts or their capacity to swell in solvents is important in the process according to the invention because, in the known method of preparing polyurethanes in highly polar solvents by simply removing the solvents, e.g. by evaporation, one only obtains products which are impermeable to water vapor. In the process according to the invention, on the other hand, the polyaddition is carried out in a non-solvent or in a solvent mixture which contains a non-solvent for the polyadduct which is to be formed.

Non-solvents for the polyaddition product which is to be formed are volatile liquids which a homogeneous film of a thickness e.g. of 0.2 to 0.5 mm. of the polyurethane which is to be formed absorbs to an extent of less than 75% by weight, preferably less than 40% by weight within 24 hours at room temperature.

The following are examples of non-solvents which may be used in the process according to the invention: aromatic hydrocarbons such as benzene, ethyl benzene, toluene, xylene and tetralin; commercial solvent mixtures which contain aromatic hydrocarbons such as Sangajol; aliphatic hydrocarbons such as hexane, heptane, octane, nonane, decane and their stereo-isomers; petroleum fractions such as petroleum ether, ligroin, cleaning petrol, mineral spirits, heavy petrol, mepasin, cycloaliphatic hydrocarbons such as Decalin, methylcyclohexane and oil of turpentine; chlorinated hydrocarbons such as chloroform, dichloroethylene, trichloroethylene, hexachloroethane, perchloroethylene, chlorocyclohexane and methyl chlorocyclohexane; esters such as methyl acetate, ethyl acetate, propyl acetate, butyl acetate and formic acid esters; ketones such as acetone, butanone-(2) and pentanone-(2); ethers such as diethyl, dipropyl and dibutylethers; nitro compounds such as nitromethane and nitrobenzene, alcohols such as tertiary butanol and nitriles such as acetonitrile.

Non-solvents which do not take too long to evaporate, i.e. those whose boiling points are below 300° C., preferably below 200° C. are preferably used. Higher boiling compounds such as paraffin oil may, however, also be used. These are usually removed by pressure or extraction after the polyaddition reaction is complete.

The polyaddition reaction may also be carried out in the presence of solid substances which are inert under the conditions of polyaddition, such as salts, waxes or organic compounds which are solid at room temperature, for example methyl stearate. These solids are subsequently washed out or extracted. This procedure, however, is uneconomical compared with the evaporation of volatile compounds.

Solvents for the polyaddition product which is to be formed are volatile, liquid compounds which either dissolve the polyaddition product or cause it to swell to such an extent that a homogeneous film of 0.2 to 0.5 mm. in thickness absorbs more than 75% by weight by swelling after 24 hours at room temperature. Examples of such solvents which may be used in accordance with this invention include Aromatic hydrocarbons such as benzene, toluene, xylene, and tetralin; chlorinated hydrocarbons such as methylene chloride, chloroform, trichloroethylene, tetrachlorethane, dichloropropane and chlorobenzene; esters such as ethyl, propyl or butyl acetate; ketones such as acetone, butanone-(2), pentanone-(2) and cyclohexanone, ethers such as furan, tetrahydrofuran, dioxane, anisole and phenetole; dialkoxyethanes and ether esters of glycol, acid amides such as formamide, dimethylformamide, dimethylacetamide and sulphoxides such as dimethyl sulphoxide, and also diethyl carbonate and Decalin.

Depending on the starting material used, the same compound may be in one case a solvent and in another case a non-solvent when carrying out the process of the present invention. The lists of solvent and non-solvents therefore overlap to some extent. The solvents may be used in mixtures with the above mentioned non-solvents provided their evaporation numbers according to DIN 53 170 are lower than those of the non-solvents so that on drying they evaporate substantially before the non-solvents. A ratio of evaporation numbers of 1:1.5 (solvent to non-solvent) is generally sufficient, but the ratio is preferably more than 1:2.5, i.e. the non-solvent should have an evaporation number which is 2.5 times greater than that of the solvent.

A measure of the porosity of a sheet structure and hence a measure of its permeability to water vapor is its bulk density. Non-porous polyurethanes have bulk densities of above 1.1 to 1.3 g./cc. The corresponding porous polyurethanes should have a bulk density of less than 0.8 g./cc., i.e. a third of the sheeting should consist of pores and two thirds of solid material. This means that when solidification of the sheet structure occurs but without substantial reduction in volume (shrinkage), the concentration of the polymer in the reaction mixture should be not more than 60 to 70 volumes percent.

The process is not generally carried out under pressure or in a closed system, so that from the moment the reaction solution is poured out to the moment the sheeting solidifies, considerable quantities of solvent can evaporate. Correspondingly dilute solutions are therefore used in these cases. If the process is carried out in a closed system at the saturation vapor pressure of the solvent, the initial concentration of the reactants may be higher.

Solutions which have a solids content of less than 10 volumes percent are generally not of commercial importance.

The reaction of the NCO group with the OH group in solution generally requires the use of a catalyst because it otherwise will proceed too slowly for industrial purposes. Suitable catalysts are known and can be found in the literature, e.g. J. H. Saunders; K. C. Frisch "Polyurethanes," Part I, New York, 1962, 211–215.

The following compounds are examples of some catalysts which may be used: tertiary amines such as trimethylamine, triethylamine, dimethylbenzylamine, dimethylaniline, pyridine, N-methylpyridine, N-methylpyrrolidine, diazabicyclooctane and tin compounds such as tin dioctoate, dibutyl tin dilaurate. In one particular embodiment of the process of the invention, catalysts of moderate activity are used in the first stages of the reaction (e.g. aromatic catalysts such as dimethylaniline, mixed aromatic-aliphatic tertiary amines such as dimethylbenzylamine or N-heterocyclic compounds such as pyridine, tin compounds such as tin dioctoate), and stronger catalysts are used for carrying out the remaining cross-linking reaction (e.g. aliphatic tertiary amines such as triethylamine, trimethylamine and certain tin compounds such as dibutyl tin dilaurate).

Catalysts which owing to their volatility evaporate from the finished sheet structures are preferably used because otherwise the resistance of the sheetings to hydrolysis would be considerably impaired.

The reaction may be carried out as follows: NCO-terminated prepolymers, if desired together with monomeric polyisocyanate, or alternatively, the compounds which contain OH or NH groups, are dissolved in non-solvents or mixtures of non-solvents and solvents. After a part of the equivalent quantity (e.g. 40–80%) of the polyols (polyamines) or polyisocyanates have been added, the catalyst, if used, may be introduced, and the reaction mixture is then stirred until the viscosity or cloudiness of the solution increases. The remainder of the equivalent quantity of the third component required for production of the polyadduct and if desired some more catalysts are added to the reaction mixture, if desired stepwise, and the reaction mixture is then poured on to a porous or non-porous support. The reaction is generally completed at elevated temperature and the solvents are evaporated off at the same time or thereafter.

The solvents may be evaporated off within a wide temperature range, e.g. from 0 to 200° C. The temperature chosen depends on the method employed and on the volatility of the solvent; lower temperatures may be employed when operating under a vacuum, for example, than at normal pressure. The solvents are preferably evaporated at 20 to 120° C. Instead of being removed by evaporation, the solvents may, for example, also be washed out or otherwise flushed out.

If the starting materials are insoluble in the solvents used, they must constitute the internal phase when the dispersion is formed.

The sheet structures obtained have particularly good mechanical properties, very good flexibility and excellent solvent resistance. The permeability of the microporous sheetings obtained to water vapor (see IUP 15 or "Das Leder" 12 (1961), 86–88) depends on the amounts of solvents and non-solvents used, and is generally between 1 and 20 mg./h./cm.$^2$.

The reaction mixture may be modified by the addition of other polymers, e.g. polyvinyl compounds (such as polyvinyl chloride, polyvinyl acetate, polyvinyl alcohol), polyethylene, polystyrene, polyacrylonitrile, polymers of acrylonitrile, butadiene and styrene, polyamides or polyurethanes. The polymers may be used in solid, or dispersed form, or in solution.

Dyes, pigments, silicone compounds, emulsifiers and fillers may also be added.

The microporous film may, in addition, be cross-linked. The cross-linking agents may be added to the reaction mixture or to the finished microporous film. Suitable cross-linking agents include, formaldehyde, compounds which split off formaldehyde, peroxides and polyisocyanates. If cross-linking with polyisocyanates is desired, this carried out by varying the NCO/OH ratio, or is carried and, advantageously, on the finished microporous film.

If a non-porous support is used in the production of the sheet structure, the dry microporous sheet structure obtained is advantageously transferred to porous substrates in the manner of the known reversing process and bonded to it by means of discontinuous coats of adhesive. The laminates produced either directly on porous supports or by the reversing technique may be finished by any of the usual processes employed in the production of artificial leather.

One advantage of the process is the large number of ways in which it may be varied in respect of the choice of materials and solvents used. Further, toxic and expensive solvents are not necessary. The pourable reaction mass contains much less solvent (and non-solvent) than in other procedures, which facilitates solvent (and non-solvent) removal. The products produced by the process may be used as filter materials and as porous coatings for textiles etc.

The process according to the invention is described in more detail below by the following examples. The parts mentioned in the examples are parts by weight unless otherwise indicated.

EXAMPLE 1

About 18.2 parts (20 mmol OH) of a partly branched polyester of adipic acid, diethylene glycol and 6.3 mols percent (based on the diethylene glycol) of 1,1,1-trihydroxymethylpropane of molecular weight 1870 and OH number 60, and about 3 parts (30 mmol OH) of bis-$\beta$-hydroxyethoxy-benzene-(1,4) are dissolved in about 100 parts by volume of dioxane. About 5 parts of 4,4'-diphenylmethane diisocyanate (40 mmol NCO) and about 1 part of dimethylbenzylamine are added at about 95° C. and stirred for about 240 seconds, and about 1.9 parts (15 mmol NCO) of 4,4'-diphenylmethane diisocyanate and about 0.2 part of diazabicyclooctane are added and the mixture is stirred for about 60 seconds. The mixture is then poured on to glass plates about 1400 cm.$^2$ in area and the polyaddition reaction is carried out at about 100° C., the solvent evaporating at the same time. A transparent film which had 100% higher tensile strength and elongation at break and 65% greater tear propagation resistance than a film which was produced in a similar manner but in which the diisocyanate was added all at once was obtained.

EXAMPLE 2

About 20 parts (20 mmol OH) of a linear polyester of adipic acid and ethylene glycol (OH number 56, 1.8% OH) and about 1.8 parts (40 mmol OH) of butylene glycol are dissolved in about 100 parts by volume of xylene (commercial mixture of isomers) and heated to about 110° C. After addition of about 6 parts (48 mmol NCO) of 4,4'-diphenylmethane diisocyanate, the mixture is stirred for about 5 minutes and after further addition of about 3 parts (24 mmol NCO) of 4,4'-diphenylmethane diisocyanate and about 0.1 part of dibutyl tin dilaurate, it is stirred for about 8 seconds and poured on to silicone-treated backing paper which could subsequently be removed. The polyaddition reaction is completed at room temperature with simultaneous evaporation of the solvent to form a microporous film having a permeability to water vapor of 1.1 mg./h./cm.$^2$.

The preparations shown in Table 1 are carried out in a manner analogous to Example 2.

TABLE 1

| Polyester | Parts | OH, mmol | Polyol | Parts | OH, mmol | Solvent | Parts by volume | Polyisocyante in first stage | Parts | NCO, mmol |
|---|---|---|---|---|---|---|---|---|---|---|
| A | 28 | 30 | Butane-1,4-diol | 3.1 | 70 | Ethyl acetate / Mineral spirits (aliphatic hydrocarbon mixture of boiling range 140-196° C.) | 40 / 30 | 4,4'-diphenyl methane diisocyanate | 12 | 96 |
| B | 18.2 | 20 | Bis-(β-hydroxyethoxy)-benzene-(1,4) | 3 | 30 | Dioxane / Mineral spirits | 100 / 30 | do | 5 / 5 | 40 / 40 |
| A | 18.2 | 20 | Diethylene glycol | 5 | 100 | Butyl acetate / Mineral spirits | 50 / 40 | C | 10 | 65 |
| B | 36.4 | 40 | Bis-(β-hydroxyethoxy) naphthalene-(1,5)- | 7.4 | 60 | Butyl acetate / Xylene | 70 / 90 | 4,4'-diphenylmethane diisocyanate | 7 | 56 |
| B | 18.2 | 20 | Bis-(β-hydroxyethoxy)-benzene-(1,4). | 6 | 60 | Butyl acetate / Xylene | 40 / 40 | Hexamethylene diisocyanate-(1,6). | 2.5 | 30 |

| Polyester | Catalyst | Parts | Stirring time (sec.) | Polyisocyanate in second stage | Parts | NCO, mmol | Catalyst | Parts | Stirring time (sec.) | Reaction temp. (° C.) | Drying temp. (° C.) | Permeability to water vapor (mg./h./cm.²) |
|---|---|---|---|---|---|---|---|---|---|---|---|---|
| A | Dimethyl aniline | 0.8 | 600 | 4,4'-diphenyl methane diisocyanate | 4.2 | 34 | Diazabicyclooctane | 0.1 | 35 | 80 | 60 | 1 |
| B | Dimethyl benzyl amine | 1 | 300 | do | 1.9 | 15 | do | 0.2 | 19 | 90 | 80 | 12 |
| A | | | 480 | C | 10 | 65 | do | 0.3 | 6 | 100 | 80 | 2.6 |
| B | Diazabicyclooctane | 0.1 | 120 | 4,4'-diphenyl methane diisocyanate | 6.7 | 54 | do | 0.3 | 30 | 100 | 110 | 12.3 |
| B | do | 0.5 | 600 | do | 7.5 | 60 | | | 10 | 100 | 100 | 9 |

NOTE.—A = Polyester of adipic acid, hexanediol and neopentyl glycol, of molecular weight 1,870; OH number 60. B = Polyester of adipic acid, diethylene glycol 6.3 mols percent (based on diethyleneglycol) and trimethylolpropane, of molecular weight 1,870, OH number 60. C = Partially carbodiimidized 4,4'-diphenylmethane diisocyanate, 33% NCO.

EXAMPLE 3

About 27.2 parts (30 mmol OH) of the polyester used in Example 2 and about 5.55 parts (45 mmol OH) of bis-(β-hydroxyethoxy)-naphthalene-(1,5) are melted until a clear melt is obtained. The melt is dissolved in about 45 parts by volume of xylene and about 75 parts by volume of butyl acetate which are added thereto and 4.4 parts of 4,4'-diphenylmethane diisocyanate (35 mmol NCO) are added to this solution at about 100° C. After stirring for about 240 seconds, about 6 parts (48 mmol of NCO) of 4,4'-diphenylmethane diisocyanate and about 0.3 part of diazabicyclooctane are added to the solution which is then poured on to glass plates 500 cm.² in area after stirring for about 18 seconds. The film is observed to solidify at a drying temperature of about 100° C. with simultaneous evaporation of the solvent.

| Time (min.) | 0 | 5 | 10 | 15 | 20 | 25 | 30 | 35 | 50 | 240 |
|---|---|---|---|---|---|---|---|---|---|---|
| Weight of film (grams) | 132.8 | 106 | 80 | 63 | 57 | 46 | 43 | 43 | 42 | 42 |
| Shore A | | 20 | 30 | 40 | 45 | 47 | 50 | 55 | 60 | 65 |

The film obtained had a permeability to water vapor of 9 mg./h./cm.².

EXAMPLE 4

About 18.2 parts (20 mmol OH) of the polyester used in Example 2 and about 1.8 parts of aminoethanol (40 mmol OH and 40 mmol NH) are dissolved in a mixture of about 80 parts by volume of butyl acetate, about 30 parts by volume of xylene and about 50 parts by volume of dioxane. About 2.5 parts of hexamethylene diisocyanate (30 mmol NCO) are introduced at about 100° C., and after stirring for about 40 seconds, about 7.5 parts (60 mmol NCO) of 4,4'-diphenylmethane diisocyanate together with about 0.2 part of diazabicyclooctane are added and the reaction mixture is stirred for about 20 seconds and then poured on to glass plates, about 1400 cm.² in area. After the reaction mixture is left to stand for about 10 minutes at room temperature, it is dried in a circulating air drying cupboard at about 80° C. A microporous film having a permeability to water vapor of 1.2 mg./h./cm.² is obtained.

EXAMPLE 5

About 40 parts (30 mmol NCO) of an NCO-containing prepolymer of polypropylene glycol ether (molecular weight 2000) and 4,4'-diphenylmethane-diisocyanate (3.3% NCO) are dissolved in about 60 parts by volume of dichloropropane-(1,2) and about 200 parts by volume of xylene. About 0.3 part of anhydrous hydrazine (20 mmol NH) is added at about 100° C. and the reaction solution is stirred for about 8 minutes. About 100 parts by volume of mineral spirits, about 2.8 parts (20 mmol NCO) of a carbodiimide-containing 4,4'-diphenylmethane diisocyanate, about 12.5 parts (100 mmol NCO) of 4,4'-diphenylmethane diisocyanate, about 12 parts of bis-(β-hydroxyethoxy)-benzene-(1,4) (120 mmol OH) and about 0.3 part of diazabicyclooctane are then added and the mixture is stirred for about 45 seconds, poured out and dried at room temperature. A film having a permeability to water vapor of 0.7 mg./h./cm.² is obtained.

EXAMPLE 6

About 4 parts of a linear polyester of adipic acid and ethylene glycol (OH number 56) and about 1 part of 4,4'-diphenylmethane diisocyanate are reacted together in about 15 parts of 1,2-dichloropropane, and about 0.2 part of diethanolamine is then added. About 40 parts of the same polyester, about 3.6 parts of butane-1,4-diol, about 70 parts by volume of butyl acetate and about 50 parts by volume of xylene are added to this viscous dispersion which is then heated to about 80° C., mixed with about 19 parts of 4,4'-diphenylmethane diisocyanate and about 0.2 part of diazabicyclooctane and then poured out after about 80 seconds. A microporous film having a permeability to water vapor of 4.6 mg./h./cm.² is formed.

EXAMPLE 7

About 36.4 parts of a partly branched polyester of adipic acid and diethylene glycol (OH number 61; 1.9% OH) and about 0.9 part of water are dissolved in a mixture of about 90 parts by volume of butyl acetate and about 90 parts by volume of xylene. About 10 parts of 4,4'-diphenylmethane diisocyanate are added at about 100° C., and about 0.05 part of diazabicyclooctane are introduced after about 4 minutes. The reaction mixture is then stirred for about 6 minutes (slight cloudiness appeared), about 3 parts diisocyanate are added and evolution of gas and increase in viscosity are then observed, finally about 6.3 parts of diisocyanate together with about 0.5 part of diazabicyclooctane are added and the mixture is poured out on to a glass plate of about 2000 cm.² in area and dried at about 80° C. The microporous film obtained has a permeability to water vapor of 1.6 mg./h./cm.².

EXAMPLE 8

About 36.4 parts (40 mmol OH) of the polyester used in Example 2 and about 1.3 parts of water (145 mmol OH) are dissolved in about 150 parts by volume of butyl acetate, about 30 parts by volume of mineral spirits and about 50 parts by volume of dioxane, and heated to about 100° C. After the addition of a mixture of about 13 parts of 65% of 2,4- and 35% of 2,6-toluylene diisocyanate (150 mmol NCO), the temperature is kept at about 100° C. for about 15 minutes and then about 5 parts (57.5 mmol NCO) of the same diisocyanate mixture together with about 0.5 part of diazabicyclooctane are introduced. The mixture is allowed to react for about 2 seconds, and is then poured out on to a substrate, left to stand at room temperature for about 10 minutes and is then heated to about 80° C. A. microporous film which had a permeability to water vapor of 4.5 mg./h./cm.$^2$ is obtained.

EXAMPLE 9

About 36.4 parts (40 mmol OH) of the polyester used in Example 2 are dissolved in about 80 parts by volume of xylene and about 80 parts by volume of butyl acetate. This solution is heated to about 100° C. while stirred with a magnetic stirrer. About 22 parts (176 mmol NCO) of diphenylmethane-4,4-diisocyanate and about 0.2 part of diazabicyclooctane are added, and the mixture is stirred for about 210 seconds. About 4 parts (40 mmol OH) of bis-($\beta$-hydroxyethoxy)-benzene-1,4) are then added, the reaction mixture is stirred for about 30 seconds, a further 4 parts (40 mmol OH) are added, the mixture stirred for about 15 seconds and finally about 4 parts (40 mmol OH) of this diol are again added. The mixture is then stirred for about 10 seconds, poured out onto a glass plate and heated at about 100° C. A microporous film having a permeability to water vapor of 7.6 mg./h./cm.$^2$ is obtained.

EXAMPLE 10

In a manner analogous to Example 9, about 36.4 parts (40 mmol OH) of the polyester of Example 2 are dissolved in a mixture of about 60 parts by volume of xylene and about 60 parts by volume of butyl acetate and heated to about 100° C. with stirring. About 13.7 parts (110 mmol NCO) of diphenylmethane-4,4′-diisocyanate and about 0.5 part of dimethylbenzylamine are added, and the mixture is stirred for about 260 seconds. In two stages, about 3 parts (30 mmol OH) of bis-($\beta$-hydroxyethoxy)-benzene and, after an interval of about 90 seconds, a further about 3 parts (30 mmol OH) of this diol together with about 0.2 part of diazabicyclooctane are introduced, and the reaction mixture is stirred for about 15 seconds, poured onto a glass plate and heated at about 100° C. A microporous film having a permeability to water vapor of 0.5 mg./h./cm.$^2$ is obtained.

EXAMPLE 11

Example 10 is repeated, using the same compounds, but the reaction of the polyester with the diisocyanate is carried out without a catalyst, by continuous stirring at about 100° C. for about 720 seconds. About 3 parts (30 mmol OH) of bis-($\beta$-hydroxyethoxy)-benzene are then added, the mixture is stirred for about 200 seconds, and finally another 3 parts (30 mmol OH) of the same diol and about 0.3 part of diazabicyclooctane are added. The solution is then stirred for about 40 seconds and a part of it is poured out on to a teflonized metal plate and the remainder on to a glass plate. The shaped mixtures are then heated at about 100° C. Microporous films having a permeability to water vapor of 0.7 (metal plate) and 1.3 (glass plate) mg./h./cm.$^2$ are obtained.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the production of microporous sheet structures which comprises reacting (1) an organic compound containing at least two terminal NCO groups and having a molecular weight of from about 100 to about 10,000 with substantially equivalent amounts of a member selected from the group consisting of (2) an organic compound containing at least two OH or NH groups and having a molecular weight of from 500 to about 10,000 and (3) a compound having a molecular weight of from about 18 to 500 selected from the group consisting of water and a compound containing at least two OH or NH groups or at least one OH and one NH group, in a liquid that is a solvent for the reactants but a non-solvent for the product of the reactants, the reactants being selected such that when formed into a homogeneous elastomeric product, the product has a tensile strength of at least 50 kg. wt./cm.$^2$, a Shore A hardness of at least 40 and a softening range above 80° C., the reaction being carried out by adding one of the reactants to the others in at least two increments whereby the reaction is substantially complete after each addition, applying the reaction mixture to a substrate, completing the reaction and removing the liquid.

2. The process of claim 1 wherein the inert medium is a solvent for the reactants and a non-solvent for the product of the reactants or a solvent mixture that contains at least one non-solvent for the product, the non-solvent having an evaporation number at least 1.5 times greater than that of the other solvent components.

3. The process of claim 1 wherein the compound (3) is added stepwise to a mixture of compounds (1) and (2).

4. The process of claim 1 wherein the compound (2) is added stepwise to a mixture of compounds (1) and (3).

5. The process of claim 1 wherein the reaction of components 1, 2 and 3 is conducted in the presence of a catalyst.

6. The process according to claim 1 wherein a weak catalyst is added to the reaction mixture in the first increment and a highly active catalyst is added in subsequent increments.

7. The process of claim 1 wherein mixing of the reactants is conducted continuously and the reaction mixture applied to substrates.

References Cited
UNITED STATES PATENTS

| | | | |
|---|---|---|---|
| 3,000,757 | 9/1961 | Johnston | 117—135.5 X |
| 3,190,765 | 6/1965 | Yuan | 117—135.5 X |
| 3,208,875 | 9/1965 | Holden | 117—135.5 |
| 3,281,396 | 10/1966 | Barnes | 264—41 X |
| 3,310,533 | 3/1967 | McElroy | 117—161 X |
| 3,384,506 | 5/1968 | Elkin | 117—135.5 X |
| 3,386,962 | 6/1968 | Damusis | 117—161 X |
| 3,401,133 | 9/1968 | Grace | 117—161 X |
| 3,410,817 | 11/1968 | McClellan | 117—161 X |
| 3,445,272 | 5/1969 | Newton | 117—135.5 X |
| 3,460,969 | 8/1969 | Murphy | 117—135.5 X |
| 3,256,213 | 6/1966 | Gmitter et al. | 260—2.5 |

FOREIGN PATENTS

| | | | |
|---|---|---|---|
| 6700072 | 1/1967 | Netherlands | 260—2.5 |
| 1,510,261 | 1/1967 | Great Britain | 260—2.5 |

WILLIAM D. MARTIN, Primary Examiner

W. R. TRENOR, Assistant Examiner

U.S. Cl. X.R.

117—62, 135.5; 260—2.5 AY, 858; 264—41